United States Patent
Lai et al.

(10) Patent No.: US 8,295,068 B2
(45) Date of Patent: Oct. 23, 2012

(54) SHIFT FULL BRIDGE POWER CONVERTING SYSTEM AND CONTROL METHOD THEREOF

(75) Inventors: Yen-Shin Lai, Taipei (TW); Bo-Yuan Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 446 days.

(21) Appl. No.: 12/698,387

(22) Filed: Feb. 2, 2010

(65) Prior Publication Data

US 2011/0188267 A1 Aug. 4, 2011

(51) Int. Cl.
*H02M 3/24* (2006.01)

(52) U.S. Cl. .......................................... 363/98; 363/132

(58) Field of Classification Search ............. 363/16–20, 363/56.03, 62, 65, 97–98, 132; 320/107, 320/111, 139, 145
See application file for complete search history.

(56) References Cited

U.S. PATENT DOCUMENTS

| | | | | |
|---|---|---|---|---|
| 4,864,479 A | * | 9/1989 | Steigerwald et al. | 363/17 |
| 6,803,746 B2 | * | 10/2004 | Aker et al. | 320/139 |
| 7,099,169 B2 | * | 8/2006 | West et al. | 363/132 |
| 7,330,366 B2 | * | 2/2008 | Lee et al. | 363/101 |
| 8,098,500 B2 | * | 1/2012 | Heo et al. | 363/17 |

* cited by examiner

*Primary Examiner* — Rajnikant Patel
(74) *Attorney, Agent, or Firm* — Muncy, Geissler, Olds & Lowe, PLLC (57) ABSTRACT

A phase shift full bridge power converting system and a control method has the phase shift full bridge power converting system with a power converter, a controller, a load state detecting module, a switching controller, a switch module, a command generating module, a comparator, and a modulator module. The load state detecting module interfaces with the power converter and the switching controller. The load state detects module detects load parameter data of the power converter and switches a state at an output by using the switching controller. The controller obtains an error value between an output voltage of the comparator and a command voltage and calculates a duty cycle parameter by using the error value. According to the duty cycle parameter, a pulse control signal is generated to be outputted to a drive module for controlling the driving of the power converter.

15 Claims, 7 Drawing Sheets

SHIFT FULL BRIDGE POWER CONVERTING SYSTEM AND CONTROL METHOD THEREOF

BACKGROUND OF THE INVENTION

1. Field of the Invention

The present invention relates to a phase shift full bridge power converting system and a control method thereof, and more particularly, to a control method which switches states according to an output load state to optimize the performance of the power supply.

2. Description of the Prior Art

As global warming becomes a major concern, there have been studies on how to improve the efficiency of the power converters to reduce the $CO_2$ emission. It is estimated that in average family has 20 appliances which consume power while they are not in operation. The power consumed is about 5% to 10% of the total power used for one family. This power consumption is used for keeping the appliances in standby states and for the power converters to converting AC power to DC power. Therefore, it is necessary to reduce the power consumption of the power converter while it is in the standby mode.

There are different power supply designs, such as a single-stage or a multi-stage power supply design for power converters operating in different load conditions. The single-stage power supply is often applied for low wattage equipment. Common low wattage single stage power converters comprise fly back type, forward type and half bridge type single stage power converters. On the other hand, the multi-stage power supply is often applied for high wattage equipment for there could be a low power factor problem. The first stage of the multi-stage power supply is an AC/DC power factor corrector for improving the power factor to be as close as a unity power factor and the second stage is a phase shift full bridge DC/DC power converter for providing a highly efficient and stable DC voltage. During the standby state, the first stage will stop switching, but the second stage keeps operating for supplying a stable DC voltage to the load, and therefore, most of the standby power consumption is from the second stage phase shift full bridge DC/DC power converter. Besides, the phase shift full bridge DC/DC power converter still cannot achieve zero voltage switching under a light load condition and causes additional power consumption during the light load state.

Therefore, the prior art power converting techniques present several shortcomings to be overcome.

In view of the deficiencies of the prior art power converting techniques, after years of constant researches, the inventor has successfully proposed a phase shift full bridge power converting system and a control method thereof in the present invention.

SUMMARY OF THE INVENTION

It is an object of the present invention to provide a phase shift full bridge power converting system and control method thereof, which can change an output of a modulator according to a load state to reduce the standby power consumption and increase power converting efficiency in the light load state.

It is another object of the present invention to provide a phase shift full bridge power converting system and control method thereof to reduce the power consumption when the power converter is operating under the light load condition; therefore, the present invention can improve the efficiency of the full bridge power converter by changing an output of the modulator according to different load states.

In order to achieve the above objects, the present invention discloses a phase shift full bridge power converting system and a control method thereof, wherein the phase shift full bridge power converting system comprises a power converter, a controller, a load state detecting module, a switching controller, a switch module, a command generating module, a comparator, and a modulator module, wherein the load state detecting module interfaces with the power converter and the switching controller, the load state detects module detects load parameter data of the power converter and outputs the load parameter data to the switching controller, then the switching controller determines a load state (standby, light load, and heavy load) according to the load parameter data to let the power converter change its switching modes (standby, light load, and heavy load switching modes); in addition, the controller obtains an error value between output voltage and command voltage and calculates a duty cycle parameter by using the error value, and according to the duty cycle parameter, generates a pulse control signal to be outputted to a drive module for controlling the driving of the power converter.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
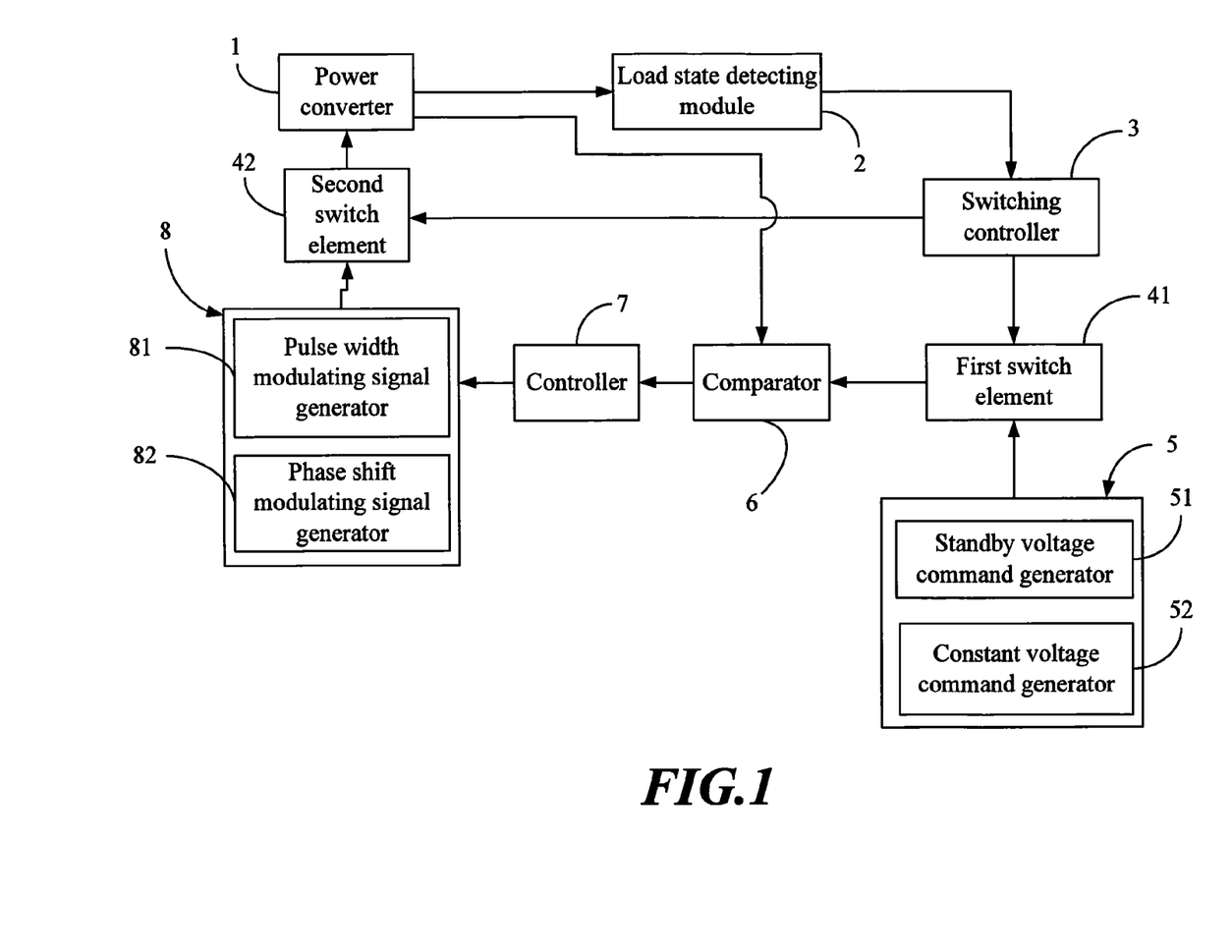
FIG. 1 illustrates a structural view of a phase shift full bridge power converting system and a control method thereof in the present invention.
Figure 2:
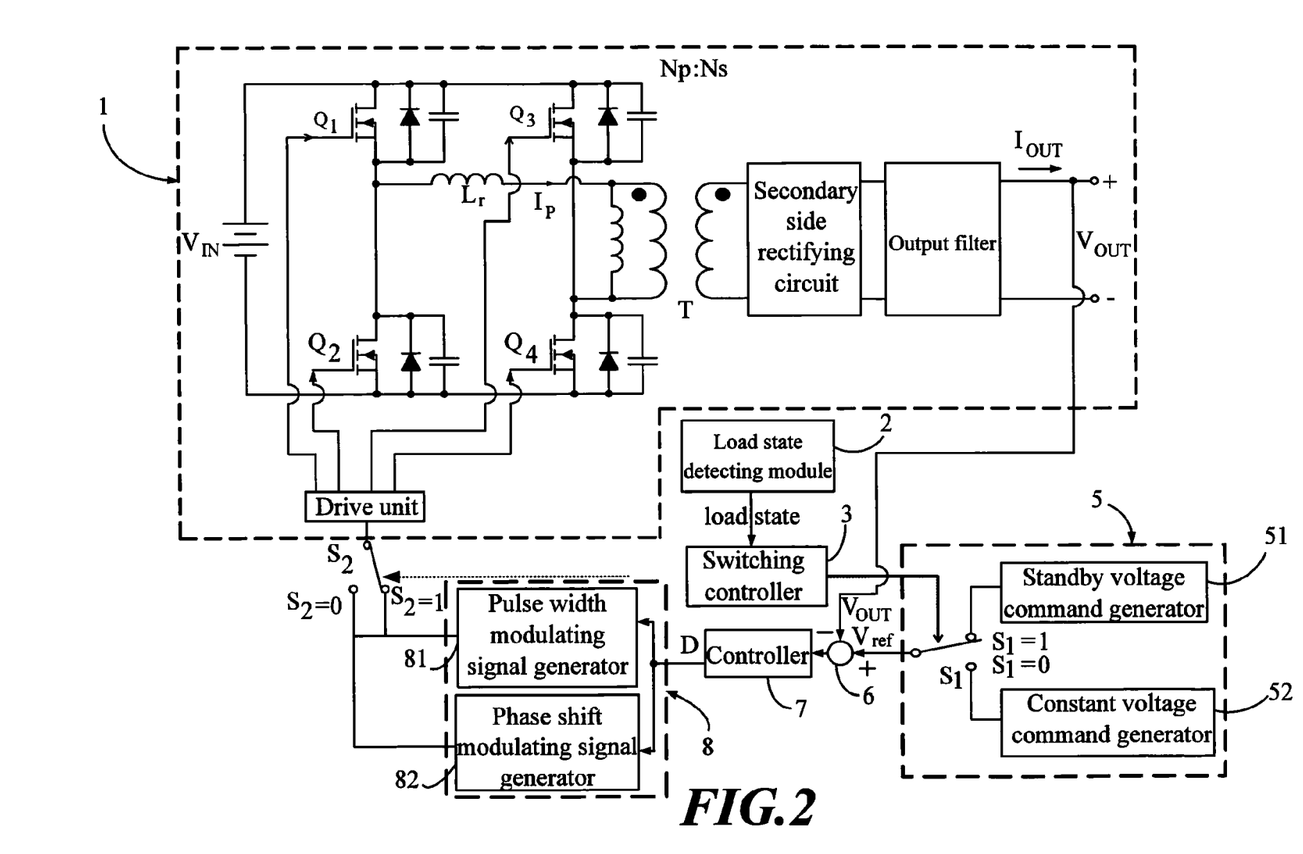
FIG. 2 illustrates a circuit diagram of the phase shift full bridge power converting system and the control method thereof in the present invention.

Please refer to FIG. 1 and FIG. 2 for a structural view and a circuit diagram of a phase shift full bridge power converting system and a control method thereof in the present invention. The system includes a power converter 1 which interfaces with a load state detecting module 2, a second switch element 42, and a comparator 6. The power converter 1 is responsible for converting an input voltage into an output voltage, and the power converter 1 comprises a drive unit, four switch elements which are turned on/off by the drive unit, an inductor coupled with the switch element. A transformer is coupled with a secondary side of the power converter 1, a rectifying circuit is coupled with a secondary side of the transformer, and an output filter is coupled with the rectifying circuit.

The load state detecting module 2 interfaces with the power converter 1 and the switching controller 3. The load state detecting module 2 converts output parameters from the power converter 1 (such as an output current parameter, a switch element current parameter, an inductor current parameter, an output voltage parameter, and a duty cycle parameter) into load parameter data and transmits the load parameter data to the switching controller 3. Therefore, the load state detecting module 2 can use a load-parameter-data-dependent feedback circuit as a front end input circuit. Additionally, the load state detecting module 2 can be implemented according to the parameter from the power converter 1 to output the load parameter data. The load parameter data is provided for the switching controller 3 to determine a load state, for example, when the load parameter data is a voltage, then the switching controller 3 determines a load state according to the voltage level.

The switching controller 3 interfaces with the load state detecting module 2, the first switch element 41 and the second switch element 42. The switching controller 3 determines a load state according to the load parameter data, and the switching controller 3 controls the first switch element 41 and the second switch element 42 to let the power converter 1 change its switching modes (standby, light load and heavy load); wherein the switching controller 3 can be an analog controller, a digital controller or the like.

The switch module comprises a first switch element 41 and a second switch element 42, wherein the first switch element 41 interfaces with the switching controller 3, the command generating module 5 and the comparator 6. When the first switch element 41 is turned on, it connects a standby voltage command generator 51 with the comparator 6, and when the first switch element 41 is turned off, it connects a constant voltage command generator 52 with the comparator 6. Additionally, the second switch element 42 interfaces with the power converter 1, the switching controller 3, and the modulator module 8. When the second switch element 42 is turned on, it connects the pulse width modulating signal generator 81 with the power converter 1, and when the second switch element 42 is turned off, it connects the phase shift modulating signal generator 82 with the power converter 1.

The command generating module 5 comprises the standby voltage command generator 51 and the constant voltage command generator 52. The command generating module 5 interfaces with the first switch element 41 and is responsible for generating two voltage commands (namely the standby voltage command and the constant voltage command), wherein the standby voltage command is provided for reducing the power consumption under the standby condition, and the constant voltage command is provided for generating a constant voltage command for output. Additionally, the switching controller can be an analog controller, a digital controller, or the like.

The comparator 6 interfaces with the power converter 1, the first switch element 41, and the controller 7. The comparator 6 compares an output voltage $V_{out}$ of the power converter 1 and a reference voltage $V_{ref}$ of the command generating module 5 to obtain an error value.

The controller 7 interfaces with the comparator 6 and the modulator module 8. The controller 7 calculates a duty cycle parameter D according to the error value from the comparator 6 and provides the duty cycle parameter D to a modulator module 8 for generating a pulse control signal for controlling the driving of the power converter. Additionally, the controller 7 can be an analog controller, a digital controller, or the like.

The modulator module 8 comprises a pulse width modulating signal generator 81 and a phase shift modulating signal generator 82. The modulator module 8 interfaces with the controller 7 and the second switch element 42 and is responsible for generating two modulating signals (a pulse width modulating signal and a phase shift modulating signal), and then outputs the modulating signal into the drive unit of the power converter 1 for controlling on/off of the four switch elements. Additionally, the modulator module can be an analog circuit, digital circuit, or the like which can generate pulse width and phase shift controls.

Figure 3:
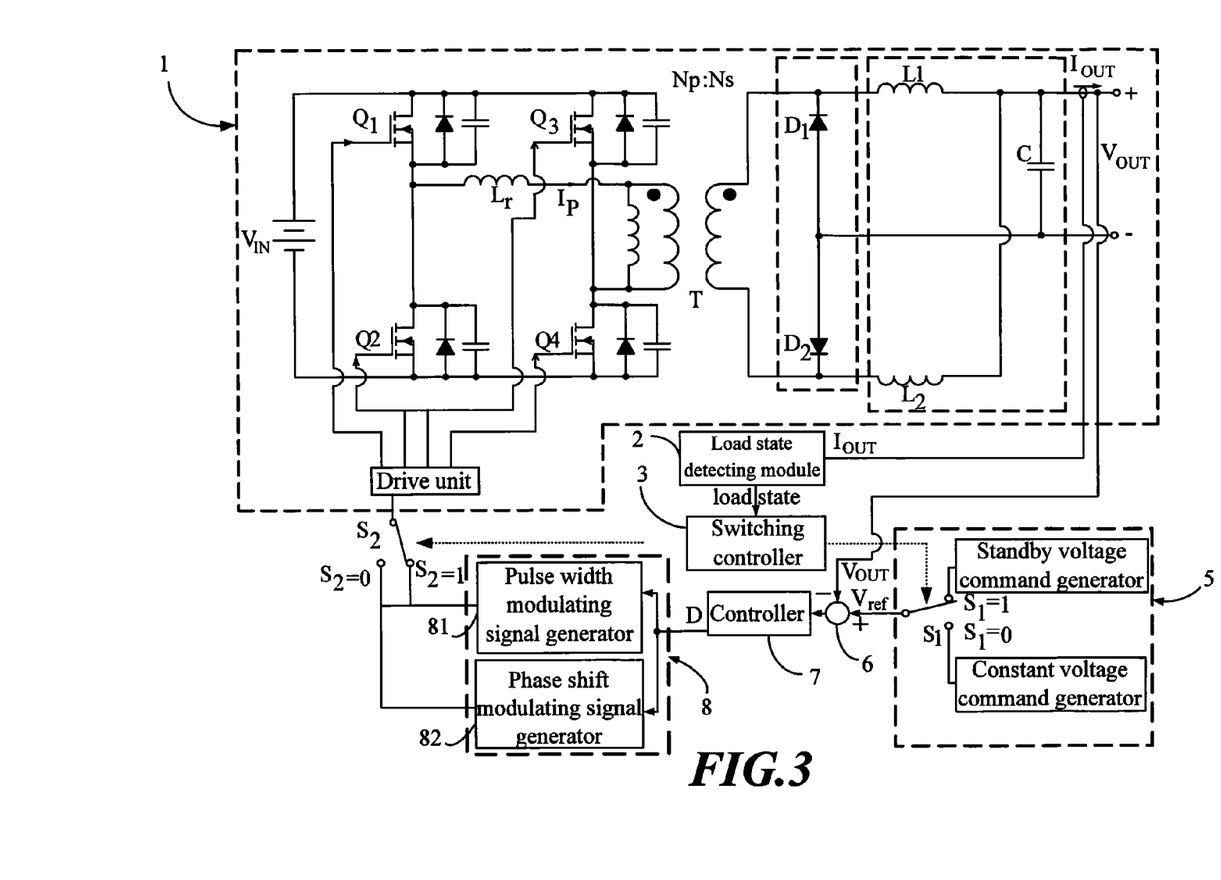
FIG. 3 illustrates an embodiment of the phase shift full bridge power converting system and the control method thereof in the present invention.

Please refer to FIG. 3 for an view of the phase shift full bridge power converting system, wherein the phase shift full bridge power converting system uses switching control to reduce the standby power consumption and to increase the efficiency of the power converter under the light load condition. The control method comprises:

(1) the load state detecting module 2 directly or indirectly obtains the output parameter data (output current $I_{out}$) and outputting an output voltage (load parameter data) to control the switching controller 3;

(2) the switching controller 3 determines a load state according to the output voltage (load parameter data) and controls the first switch element $S_1$ and the second switch element $S_2$ to let the power converter 1 change a switching mode (wherein the output voltage is obtained according to a load-dependent feedback signal);

(3) when the load state is the standby state, the power converter 1 operates in a standby switching mode, therefore the first switch element $S_1$ and the second switch element $S_2$ are turned on, and the command generating module 5 generates the standby voltage command; additionally, the modulator module 8 generates the pulse width modulating control signal for the drive unit of the power converter (the controller 7 uses the comparator 6 to obtain an error value between the output voltage and a command voltage to calculate a duty cycle parameter D, then the controller outputs the duty cycle parameter D to the modulator module 8 to generate a modulating signal for controlling the driving of the power converter 1);

(4) when the load is increased to enter the light load state, the power converter 1 operates in the light load switching mode, therefore the first switch element $S_1$ is turned off and the second switch element $S_2$ is turned on, and the command generating module 5 generates the constant voltage command; additionally, the modulator module 8 generates the pulse width modulating control signal for the drive unit of the power converter 1; the present invention is thus designed due to the fact that the phase shift full bridge converter cannot achieve zero voltage switching under the light load condition and causes additional circulating current loss and drive loss;

(5) when the load is increased to enter the heavy load state, the power converter 1 operates in the heavy load switching mode, therefore the first switch element $S_1$ and the second switch element $S_2$ are turned off, and the command generating module 5 generates the constant voltage command; additionally, the modulator module 8 generates the phase shift modulating signal for the drive unit of the power converter 1; when the power converter 1 is under the heavy load condition, all the elements on primary side can achieve zero voltage switching, therefore it is possible to reduce switching loss and to improve the efficiency of the power system. Table 1 shows the on/off states of the switching controller.

TABLE 1

On/Off states of the switching controller

| On/off state of $S_1$ and $S_2$ | $S_2 = 0$ | $S_2 = 1$ |
|---|---|---|
| $S_1 = 0$ | constant voltage command with phase shift control | constant voltage command with pulse width modulation control |
| $S_1 = 1$ | N/A | standby voltage command with pulse width modulation control |

Figure 4:
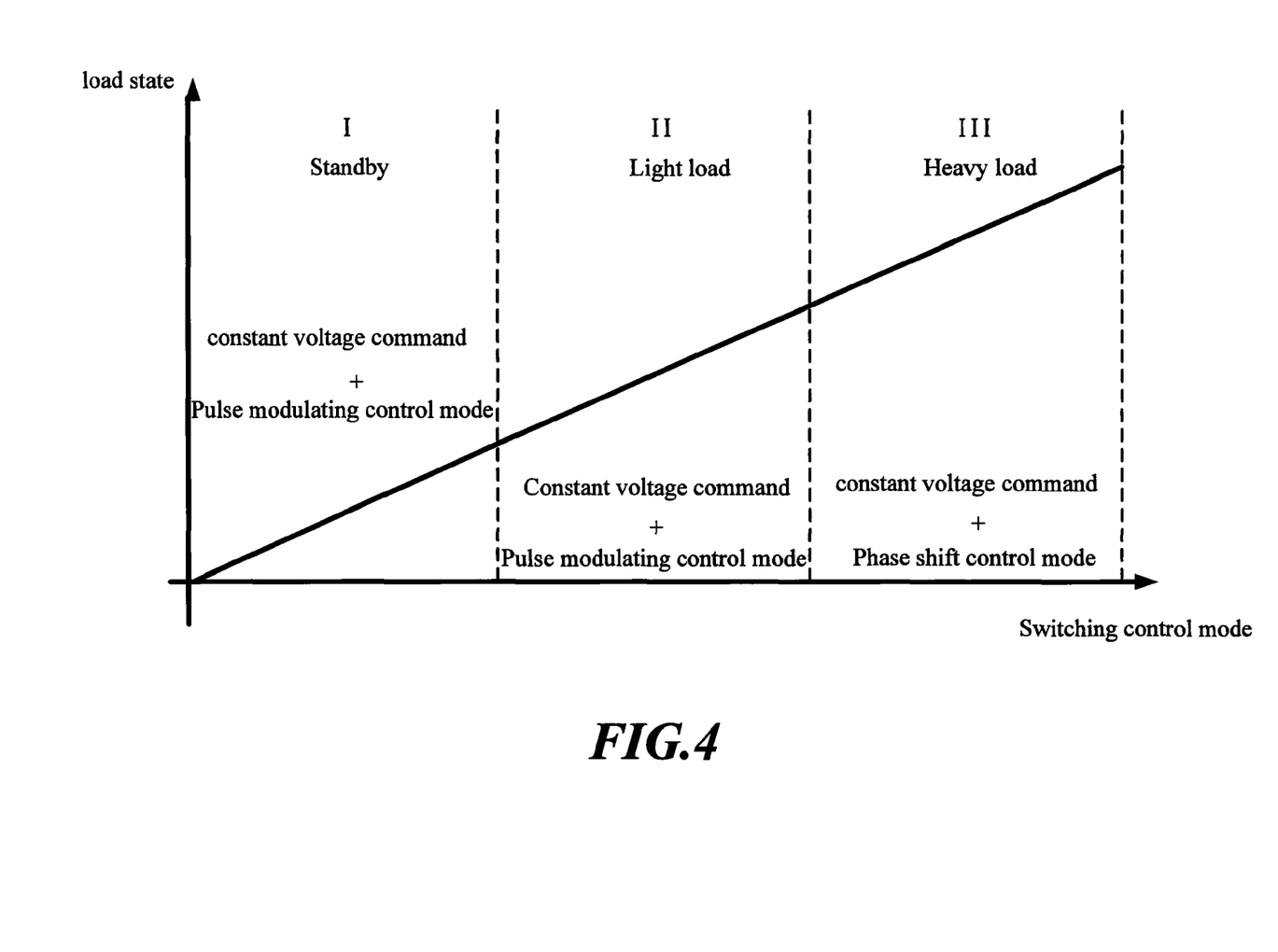
FIG. 4 illustrates transitions of switching modes of the phase shift full bridge power converting system and the control method thereof in the present invention.

Please refer to FIG. 4 for transitions of switching modes of the phase shift full bridge power converting system and the control method thereof in the present invention. From the figure, there are three switching modes (the standby switching mode, the light load switching mode, and the heavy load switching mode) for different load conditions, wherein the transition points for the three load states comprise an efficiency switching point and a zero voltage switching point; the three switching modes are described as below:

(1) when the load state is in a standby state, the power converter is in the standby switching mode;

(2) when the load is increased, the time when the power converter is switched to the heavy load switching mode is determined by a transition point having the best efficiency (the definition of efficiency is the output power divided by the input power); under the light load condition, using the light load switching mode can achieve better efficiency than using the heavy load switching mode;

(3) on the other hand, under the heavy load condition, using the heavy load switching mode can achieve better efficiency than using the light load switching mode.

Figure 5A:
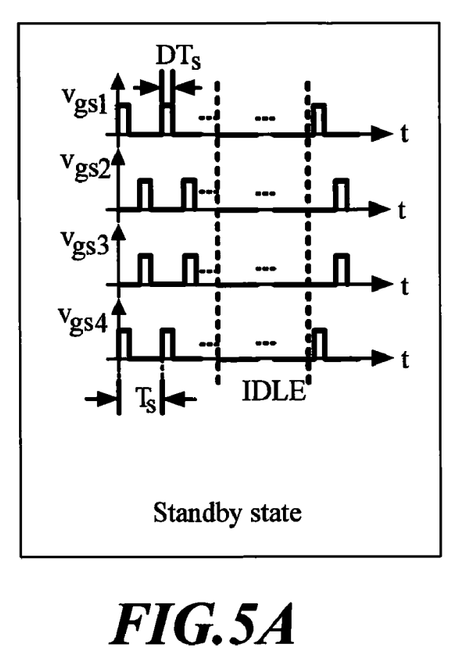
FIG. 5A illustrates waveforms of switches $Q_1$~$Q_4$ under a standby switching mode for the phase shift full bridge power converting system and the control method thereof in the present invention.
Figure 5B:
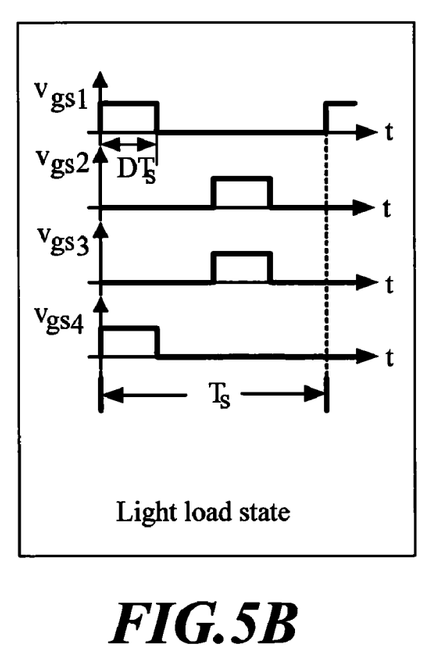
FIG. 5B illustrates waveforms of switches $Q_1$~$Q_4$ under a light load switching mode for the phase shift full bridge power converting system and the control method thereof in the present invention.
Figure 5C:
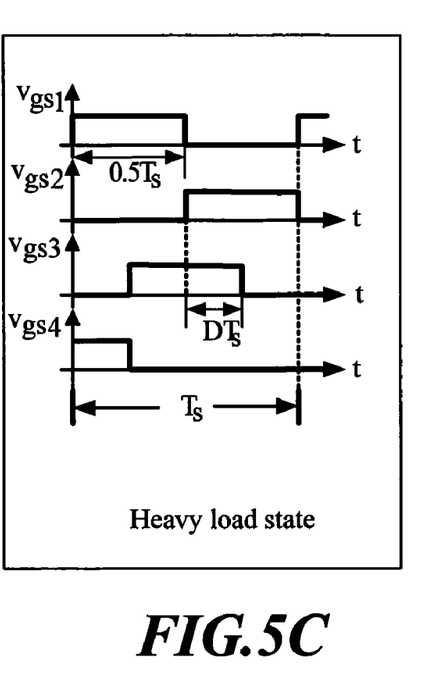
FIG. 5C illustrates waveforms of switches $Q_1$~$Q_4$ under a heavy load switching mode for the phase shift full bridge power converting system and the control method thereof in the present invention.

Please refer to FIG. 5A to FIG. 5C for waveforms of switches $Q_1$~$Q_4$ under different switching modes. That is, the standby switching mode, the light load switching mode, and the heavy load switching mode for the phase shift full bridge power converting system and the control method thereof in the present invention.

Figure 6:
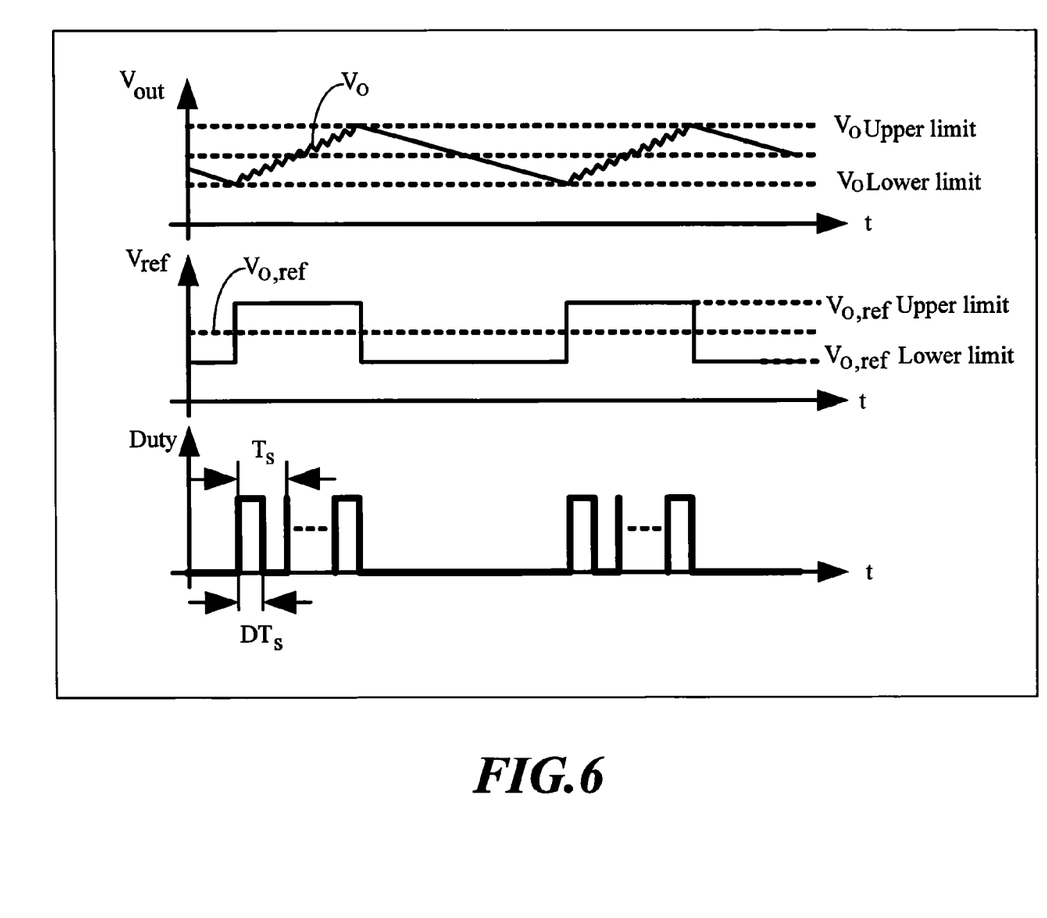
FIG. 6 shows waveforms illustrating a relationship between the generation of a standby voltage command and the pulse width modulation for the phase shift full bridge power converting system and the control method thereof in the present invention.

Please refer to FIG. 6 for waveforms illustrating a relationship between the generation of a standby voltage command and the pulse width modulation for the phase shift full bridge power converting system and the control method thereof in the present invention, wherein the standby voltage command is generated according to the state of the feedback voltage to change the voltage command to an upper limit or a lower limit of the output voltage. When the feedback voltage reaches the upper limit of the output voltage, the voltage command is adjusted to drop to the lower limit of the output voltage. When the feedback voltage drops to the lower limit of the output voltage, the voltage command is adjusted to reach the upper limit of the output voltage. Therefore, the duty cycle parameter D calculated by the controller will let the modulator module stop switching when the feedback voltage is at the upper limit of the output voltage. When the feedback voltage drops to the lower limit of the output voltage, the modulator module starts switching (during the standby state, the modulator module switches repeats a sequence of switching for one period, stopping for another period, and then starting all over again); therefore the standby voltage command can effectively improve the efficiency in the standby state and thus reduce the standby power loss.

Figure 7:
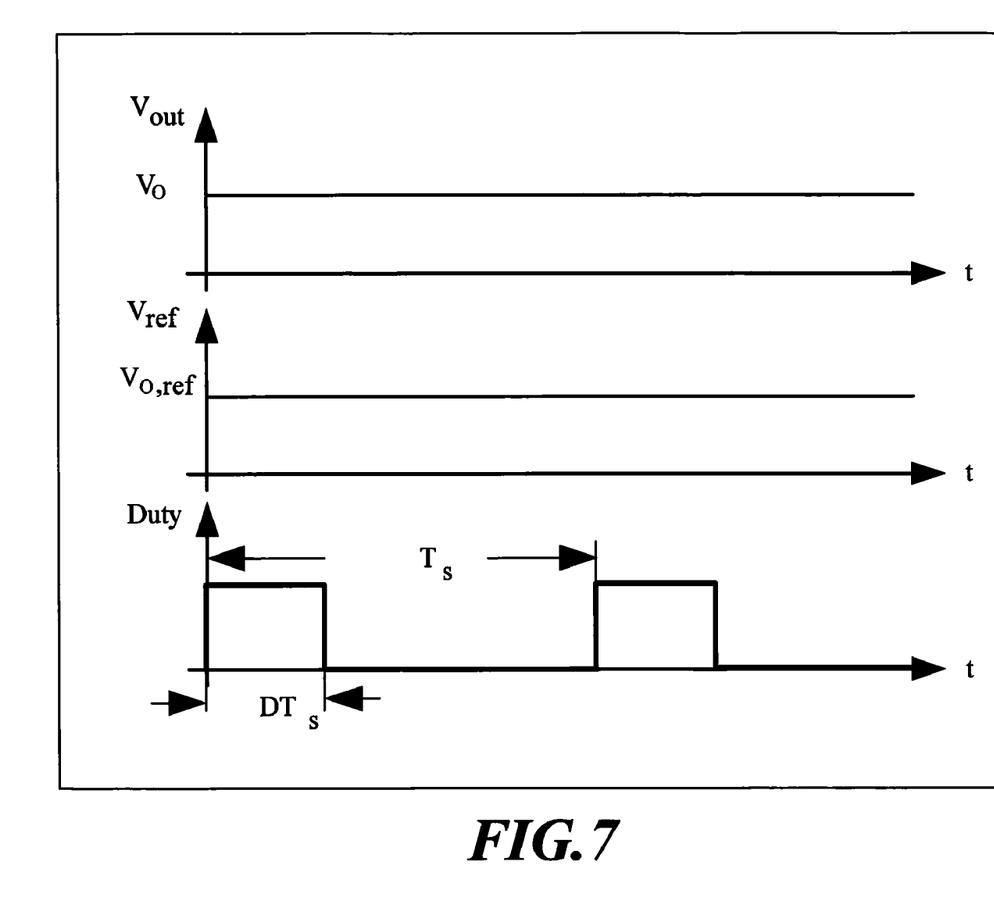
FIG. 7 shows waveforms illustrating a relationship between the generation of a constant voltage command and the pulse width modulation for the phase shift full bridge power converting system and the control method thereof in the present invention.

Please refer to FIG. 7 for waveforms illustrating a relationship between the generation of a constant voltage command and the pulse width modulation for the phase shift full bridge power converting system and the control method thereof in the present invention. When the load is increased to the light load state (small load current) and the heavy load state (large load current) respectively, a constant voltage command is generated. The constant voltage command is provided for generating a constant reference voltage for the power converter to output a constant voltage. Then the controller calculates the duty cycle parameter (by comparing the output voltage and the command voltage and feeding back the error value to the controller) and outputs the duty cycle parameter to the modulator module. Therefore, unlike the standby state, the modulator module continues to switch in the light load/heavy load states.

The present invention discloses a phase shift full bridge power converting system and a control method thereof, while compared to the prior art power converting techniques, is advantageous in:

1. The present invention provides a phase shift full bridge power converting system and control method thereof, which can improve the phase shift full bridge power supply and change switching modes according to different load conditions to optimize the efficiency of the power converter.

2. The present invention provides a phase shift full bridge power converting system and control method thereof, which can change the switching modes of the modulator according to different load states to facilitate the implementation of the phase shift full bridge power converting system and to reduce standby power consumption (circulating current loss & drive loss) and to increase the efficiency under the light load condition.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A phase shift full bridge power converting system, comprising:
    a power converter interfacing with a load state detecting module, a second switch element and a comparator for converting an input voltage into an output voltage;
    the load state detecting module interfacing with the power converter and a switching controller, the load state detecting module converting a parameter outputted by the power converter into load parameter data and outputting the load parameter data to the switching controller;
    the switching controller interfacing with the load state detecting module, a first switch element and a second switch element, the switching controller determining a load state according to the load parameter data and controlling the first switch element and the second switch element;
    a switch module comprising the first switch element and the second switch element;
    a command generating module interfacing with the first switch element and generating a voltage command;
    a comparator interfacing with the power converter, the first switch element and the controller, the comparator comparing the output voltage of the power converter and a reference voltage outputted by the command generating module to obtain an error value;
    a controller interfacing with the comparator and the modulator module, the controller calculating a duty cycle parameter according to the error value outputted by the comparator; and
    a comparator modulator module interfacing with the controller and the second switch element, the comparator modulator module generating a modulating signal and inputting the modulating signal to the power converter for controlling the driving of the power converter.

2. The phase shift full bridge power converting system as claimed in claim 1, wherein the power converter outputs parameter data comprising an output current parameter, a switch element current parameter, an inductor current parameter, an output voltage parameter, and a duty cycle parameter.

3. The phase shift full bridge power converting system as claimed in claim 1, wherein the load state detecting module uses a load-parameter-data-dependent feedback circuit as a front end input circuit.

4. The phase shift full bridge power converting system as claimed in claim 1, wherein the command generating module comprises a standby voltage command generator and a constant voltage command generator for generating a standby voltage command and a constant voltage command respectively.

5. The phase shift full bridge power converting system as claimed in claim 1, wherein the modulator module comprises a pulse width modulating signal generator and a phase shift modulating signal generator for generating a pulse width modulating signal and a phase shift modulating signal respectively.

6. The phase shift full bridge power converting system as claimed in claim 1, wherein the switching controller is an analog controller or a digital circuit.

7. The phase shift full bridge power converting system as claimed in claim 1, wherein the controller is an analog controller or a digital circuit.

8. The phase shift full bridge power converting system as claimed in claim 1, wherein the modulator module can be an analog circuit or a digital circuit which can generate pulse width and phase shift control signals.

9. A control method for the phase shift full bridge power converting system, comprising:
    the load state detecting module directly or indirectly obtaining the output parameter data and outputting load parameter data to control the switching controller;
    the switching controller determining a load state according to the load parameter data and controlling the first switch element and the second switch element to let the power converter change a switching mode; and
    the controller using the comparator to obtain an error value between the output voltage and a command voltage to calculate a duty cycle parameter, then the controller outputting the duty cycle parameter to the modulator module to generate a modulating signal for controlling the driving of the power converter.

10. The control method for the phase shift full bridge power converting system as claimed in claim 9, wherein the power converter operates in a standby switching mode when the load state is a standby state, therefore the first switch element and the second switch element are turned on, and the command generating module generates a standby voltage command; additionally the modulator module generates a pulse width modulating control signal for a drive unit of the power converter.

11. The control method for the phase shift full bridge power converting system as claimed in claim 10, wherein the standby voltage command is generated by changing the voltage command to an upper limit or a lower limit of the output voltage, and the duty cycle parameter of the controller is used for determining a switching start time and a switching stop time of the modulator module.

12. The control method for the phase shift full bridge power converting system as claimed in claim 9, wherein the power converter operates in a light load switching mode when the load state is a light load state, therefore the first switch element is turned off and the second switch element is turned on, and the command generating module generates a constant voltage command; additionally the modulator module generates the pulse width modulating control signal to the drive unit of the power converter.

13. The control method for the phase shift full bridge power converting system as claimed in claim 9, wherein the power converter operates in a heavy load switching mode when the load state is a heavy load state, therefore the first switch element and the second switch element are turned off, and the command generating module generates a constant voltage command; additionally the modulator module generates the phase shift modulating signal to the drive unit of the power converter.

14. The control method for the phase shift full bridge power converting system as claimed in claim 9, wherein the load states are switched on transition points comprising an efficiency switching point and a zero voltage switching point.

15. The control method for the phase shift full bridge power converting system as claimed in claim 9, wherein the load parameter data is obtained by using a load dependent signal to feedback to the load state detecting module, and the load dependent signal comprises an output current parameter, a switch element current parameter, an inductor current parameter, an output voltage parameter, and a duty cycle parameter.

* * * * *